United States Patent
Wyroski

[11] 3,932,954
[45] Jan. 20, 1976

[54] MOTORIZED SPINNING REEL

[76] Inventor: Alexander Hobart Wyroski, 4940 W. Oakdale Ave., Chicago, Ill. 60641

[22] Filed: Jan. 25, 1974

[21] Appl. No.: 436,616

[52] U.S. Cl. ............ 43/21; 242/84.1 A; 242/84.2 A
[51] Int. Cl. ..................... A01k 89/017; A01k 87/06
[58] Field of Search... 242/84.1 A, 84.2 A, 84.21 R; 43/21

[56] References Cited
UNITED STATES PATENTS

| 2,190,398 | 2/1940 | Bugatti | 43/21 |
| 3,017,134 | 1/1962 | Duvall | 242/84.1 A X |
| 3,411,230 | 11/1968 | Hopper | 242/84.1 A X |
| 3,438,594 | 4/1969 | Bellefeuille | 242/84.2 R |
| 3,460,778 | 8/1969 | Folbrecht | 242/84.1 A X |
| 3,544,030 | 12/1970 | Daniels | 242/84.21 R |
| 3,697,011 | 10/1972 | Christensen et al. | 242/84.1 A |

Primary Examiner—Billy S. Taylor
Attorney, Agent, or Firm—John J. Kowalik

[57] ABSTRACT

A fishing reel comprising a motorized spinner for taking up the line and having a switch positioned for easy thumb control. The reel is driven by a gear train and is adapted to be driven simultaneously by the motor and by manual cranking or the motor alone or manually. The reel comprises a housing and incorporates an electric motor mounting which is yieldable to accommodate lateral deflection of the motor to wedge apart gears on the motor drive shaft and a spinner drive shaft upon an overload developing thus preventing destruction of the motor.

4 Claims, 4 Drawing Figures

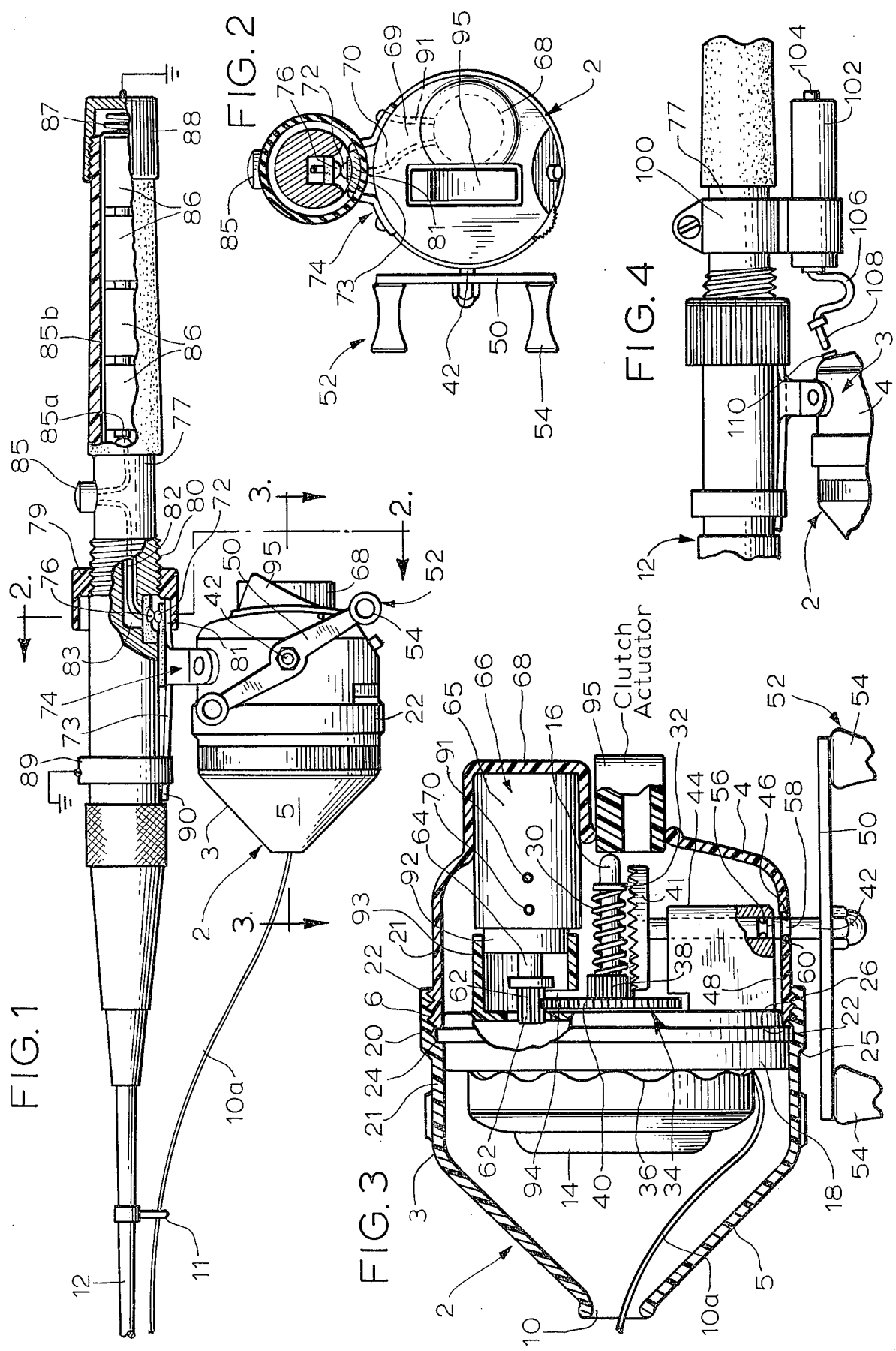

3,932,954

MOTORIZED SPINNING REEL

DISCUSSION OF THE PRIOR ART AND SUMMARY OF THE INVENTION

To applicant's best knowledge no one has heretofore developed a simple and efficient motorized reel which may be operated by one hand so that the other hand is free to, for example, gaff the fish.

The invention comprehends a simple drive mechanism which readily adapts to currently produced spinning reels and wherein the motor in no way interferes with casting, the line being free to unwind from the spool as in a conventional reel and the motor being adapted to be supplemented by manually winding the spinner or may be switched off so that the reel may be manually operated or optionally the motor alone can be operated to wind the line.

This invention is directed to an adapter for a conventional reel which converts such reel to an optionally manual and/or motor drive.

More specifically, the invention is directed to a reel assembly wherein the motor is mounted in a detachable part of the housing, the motor having a shaft connected to a small pinion drive gear which meshes with large driven gear mounted on a countershaft which is connected through the usual clutch mechanism to the spinner; a second small driven gear is connected to the countershaft and meshes with a drive gear connected to a crank driven shaft which extends to the side of the reel for connection to the crank.

Another object is to provide a novel mechanism for shifting the crank drive mechanism between engaged driving position and a disengaged non-driving position.

The invention comprehends a novel motorized drive which incorporates drive batteries in the pole handle in new equipment and in current equipment a battery attachment to the handle is provided.

These and other objects and advantages inherent in and encompassed by the invention will become more readily apparent from the specifications and the drawings wherein:

FIG. 1 is a fragmentary side elevational view of a fishing pole and reel partly in section and incorporating the invention;

FIG. 2 is a cross-sectional view taken essentially on line 2—2 of FIG. 1;

FIG. 3 is an enlarged cross-sectional view of the novel reel and drive therefor; and FIG. 4 illustrates a modification of the battery mounting and motor connection.

DESCRIPTION OF FIGS. 1–3

Describing the invention in detail and having particular reference to the drawings, the motorized spin casting reel generally designated 2 is shown as comprising a two-piece preferably plastic housing 3 including a cup-shaped base section 4 and a cap section 5 threadedly secured to each other at 6 (FIG. 3).

The cap section 5 is generally of conical shape having an opening 10 at its apex through which the fishing line 10a is metered, the line being threaded through eyelets 11 which are fastened to a rod 12. The cap section 5 encloses the spinner 14 which is suitably secured to a drive shaft 16 which is journaled through a support base 18. The base 18 fits snugly into the internal periphery 20 of the cylindrical base portion 21 of the cap and is provided with an annular rim 22 which fits within a groove 24 in the portion 21 of the cap and is held captive between the shoulder 25 at one side of the groove and the edge 26 of the base portion 4 of the housing attendant to interthreading of the cap onto the base portion 4 as at 6.

The shaft 16 is connected with the spinner 14 as well known and as for example in the "Zebco" 202 reel made by Brunswick Corporation. The shaft is spring loaded by a spring 30 which is compressed between an abutment 32 on the distal end of the shaft 16 and a gear assembly 34 which is keyed to the shaft 16 in a manner accommodating relative axial movement therebetween but constrained for rotational movement therewith.

The shaft is adapted to be shifted forwardly against the compression of the spring whereupon the spinner 14 is displaced forwardly by the clutch actuator with respect to a stationary spool 36 and about which the line is adapted to be wrapped attendant to rotation of the spinner as well known.

The gear assembly comprises a pair of spur gears 38,40 coaxially disposed on the shaft. The small spur gear 38 is driven by a ring gear 41 which is connected to a crank shaft 42. The shaft 42 is journalled in a stand off block 44 which is integral with the support base 18 and passes through an aperture 46 in the side wall 48 of the base section 4 of the housing and at its outer end is secured to a crank arm 50 of a crank 52 which has handles 54,54 mounted on its outer ends. The shaft 42 is provided with axially spaced, annular peripheral grooves 56,58 onto which a grommet-like O-ring 60 of elastomer material such as neoprene or rubber is affixed in the aperture 46 and is selectively entered into grooves 56,58 as the crank shaft 42 is shifted between engaged and disengaged positions respectively of the manual drive to engage and disengage the ring gear with respect to the small spur gear 38. The grooves 56,58 and ring 60 serve as a releasable shift lock.

The other or large gear 40 of the gear assembly meshes with a spur gear 62 which is driven by an armature shaft 64 of an electric motor 65 which has a housing 66 of tubular form, the rear portion of which is snugly press-fitted within a complementary holder shell 68 which is formed integral with the back wall 69 of the plastic base housing portion 4.

As best seen in FIG. 2, the motor has one lead 70 connected to the motor windings extended through the housing wall 66 which connects with a contact 72 insulated from and extending through an elongated mounting portion 73 of a metal bracket generally designated 74. The contact 72 is pressed into engagement with a contact 76 on the handle 77 of the fishing pole 12 by a ferrule 79 which is sleeved over the handle and threaded thereon as at 80, the ferrule releasably embracing one end portion 81 of the mounting portion 73 of the bracket 74.

The contact 76 is connected by a lead 82 extending through an axial bore 83 in the handle to a switch 85 and from thence to a contact 85a in one end of a handle extension in the form of a tubular battery holder or container 85b which contains batteries 86,86 serially arranged and having electrical contact through a spring 87 to an end cap 88 threaded on the container 85b which is preferably made of electrically conductive material such as brass and being connected to a similar metallic handle portion to which the reel is attached. Of course other obvious electrical continuity connections may be used such as metal strips or wires.

The handle portion is connected by a ring sleeve 89 to the other end 90 of the electrically conductive mounting portion 73 of the bracket and makes electrical contact therewith. The bracket portion 73 is connected to a line 91 which connects to the other end of the wiring of the electrical motor to complete the circuit. The switch may be located in any convenient location as desired, but by putting it on the rod handle, the user may easily hold the rod with one hand and actuate the switch to energize the motor to reel in the fish while with his other hand he is free to gaff or net the fish.

As best seen in FIG. 4 the forward end portion 92 of the motor housing is reduced in diameter, which snugly fits into a tubular holder 93 formed on the back side of mounting base 18 which is preferably of flexible plastic material so that it may expand to receive the reduced end portion 92 of the motor housing. The tubular holder 93 has a radial slot 94 formed therein for admitting a sector of the large spur gear 40 therethrough as best seen in FIG. 4.

One of the features of the invention is that by providing a flexible plastic holder for the driving end of the motor, in the event of a sudden snapping load on the line the gear teeth may be temporarily wedged apart to snubbingly relieve the load by lateral deflection of the motor. Thus a safety feature is inherently provided in a structure which facilitates not only fabrication, but also assembly which requires only axial withdrawal of the motor with the base casing or housing portion.

It will also be apparent that if desired if the load is such on the line that the motor is lugging, the operator may engage the manual drive and assist reeling in the catch.

If the load is too heavy on the line the ring gear will be wedged off as well as the motor driven spin gear, thus providing an automated release responsive to the load on the line. This release is adjustable by selecting the materials of the O-ring 58 as well as that of the plastic holder 93.

The spinner is readily releasable by a thumb release latch 95 pivotally mounted on the rear wall of the base portion by shifting the spinner shaft 16 forwardly, thus uncapping the spinner from the spool so that the line may unwind.

DESCRIPTION OF THE EMBODIMENT OF FIG. 4

In this embodiment, which is almost identical with the previously described parts identical to those of the previous embodiment are identified by the same reference numerals. This modification only differs from the previous one in that it is adapted for use with rods currently in use and features a clamp 100 which is mounted on the handle portion 77 of the rod and carries a battery pack 102 which is connected by a switch 104 to a dual or twin line 106 which has a plug-in 108 by means of which it may be plugged into a suitable socket structure 110 molded into the back wall of the housing. The socket 110 provides an operative electrically conducting connection through suitable wires to the motor windings for delivering electromotive force from the battery to the motor such as in the previous embodiment. A switch 104 is provided on battery pack.

It will be understood that the forgoing specification is intended to disclose several preferred embodiments and is not to be taken by way of limitation of the inventions which are intended to be covered by the appended claims.

I claim:

1. In a fishing reel having a line-receiving spool element, a guide element for guiding a line onto the spool element, and means for selectively rotating at least one of said elements relative to the other for winding the line on the spool element comprising transmission means, and selectively actuable manual and motor-driven means operatively connected to said transmission means, and said reel comprising a housing, a motor holder moulded into said housing of yieldable plastic material, said transmission comprising a motor-driven driving gear and a meshing driven gear, and said material yielding upon imposition of a predetermined load causing said gears to wedge apart to release said driven gear and thereby the line.

2. The invention according to claim 1 and said transmission means comprising a power output shaft connected to one of said elements, and gear means independently connecting the motor driven and manually actuable means to the shaft, and means for connecting said manual means and said motor driven means for conjunctively and separately driving said shaft.

3. The invention according to claim 1 and said motor-driven means comprising an electric motor, a source of electromotive power, and switching means for selectively connecting and disconnecting said source with respect to said motor.

4. The invention according to claim 1 and said motor-driven means comprising an electric motor drivingly connected to said transmission means, the combination with a rod, means for mounting said reel from said rod comprising a bracket having portions providing electrical connections to said motor, said rod having a battery-enclosing handle, batteries therein, and means including switch means connecting said batteries with the motor through said bracket portions.

\* \* \* \* \*